US011511820B2

(12) United States Patent
Hedlund

(10) Patent No.: US 11,511,820 B2
(45) Date of Patent: Nov. 29, 2022

(54) FOOTREST SYSTEM FOR A SNOWMOBILE HAVING SNOW EVACUATION

(71) Applicant: Polaris Industries Inc., Medina, MN (US)

(72) Inventor: Michael A. Hedlund, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 351 days.

(21) Appl. No.: 16/723,777

(22) Filed: Dec. 20, 2019

(65) Prior Publication Data
US 2021/0188382 A1 Jun. 24, 2021

(51) Int. Cl.
*B62J 25/00* (2020.01)
*B62J 17/00* (2020.01)

(52) U.S. Cl.
CPC .............. *B62J 25/00* (2013.01); *B62J 17/00* (2013.01)

(58) Field of Classification Search
CPC ... B62J 25/00; B62J 25/04; B62J 17/02; B62J 17/04; B62M 2027/028
USPC .................................... 296/75, 78.1
See application file for complete search history.

(56) References Cited

U.S. PATENT DOCUMENTS

| | | | |
|---|---|---|---|
| 10,766,572 B2 * | 9/2020 | Pard | B62M 9/00 |
| 2005/0034909 A1 * | 2/2005 | Vaisanen | B62M 27/02 |
| | | | 74/564 |
| 2005/0039962 A1 * | 2/2005 | Bedard | B62M 27/02 |
| | | | 180/190 |
| 2008/0196958 A1 * | 8/2008 | Vezina | B62J 25/04 |
| | | | 74/564 |
| 2011/0192667 A1 * | 8/2011 | Conn | B62J 25/06 |
| | | | 403/345 |
| 2015/0068827 A1 * | 3/2015 | Makitalo | B60K 15/073 |
| | | | 180/190 |
| 2016/0194021 A1 * | 7/2016 | Vezina | B62M 27/02 |
| | | | 180/190 |
| 2019/0047662 A1 * | 2/2019 | Lemieux | B62M 27/02 |

FOREIGN PATENT DOCUMENTS

| | | | | |
|---|---|---|---|---|
| CA | 2523999 A1 * | 4/2007 | ............ | B62D 55/07 |
| WO | WO-2008060265 A2 * | 5/2008 | ............ | B60N 2/045 |
| WO | WO-2016193901 A1 * | 12/2016 | ............ | B62D 55/07 |

OTHER PUBLICATIONS

Canadian Office Action regarding Patent Application No. 3103317, dated Mar. 2, 2022.

* cited by examiner

*Primary Examiner* — D Glenn Dayoan
*Assistant Examiner* — Kevin P Weldon
(74) *Attorney, Agent, or Firm* — Harness, Dickey & Pierce, P.L.C.

(57) ABSTRACT

A footrest system for use on a snowmobile. The footrest system includes a footrest that extends from a first proximal end to a second distal end. A fender covers a proximal portion of the footrest to define a toe pocket. A snow evacuation bore passes through the proximal portion of the footrest and the fender. The snow evacuation bore is configured to pass snow out of the toe pocket and through the footrest and fender.

25 Claims, 19 Drawing Sheets

FOOTREST SYSTEM FOR A SNOWMOBILE HAVING SNOW EVACUATION

CROSS-REFERENCE TO RELATED APPLICATIONS

This application includes related subject matter similar to that disclosed in concurrently filed: (1.) U.S. patent application Ser. No. 16/723,754, now U.S. patent Ser. No. 11/427,283 and U.S. patent application Ser. No. 16/723,745, now U.S. patent Ser. No. 11/208,168 and U.S. patent application Ser. No. 16/723,834, now U.S. patent Ser. No. 11/267,407. The entire disclosures of each of the above applications are incorporated herein by reference.

FIELD

The present disclosure relates to a footrest system for a tracked vehicle and, more particularly, to a footrest system for used on a snowmobile that includes snow evacuation.

BACKGROUND

This section provides background information related to the present disclosure which is not necessarily prior art.

Tracked vehicles, such as a snowmobile, generally include a pair of front skis for steering and a rear endless track for driving or propelling the snowmobile. A chassis, or body, of the snowmobile includes a tunnel that is positioned over the track to support a seat and prevent snow from hitting the snowmobile occupants. Positioned on either side of the tunnel is a footrest or running board where the occupant positions their feet.

Many footrest systems are formed of several individual components to enable the system to span the entire length of the area where the occupant places their feet. Many footrests in these systems also end at the toe pocket area where the users distal most portion of their foot or boot is positioned, thereby requiring additional components to extend into the toe pocket. Still further, the toe pocket area adjacent the tunnel can accumulate snow from an occupant's boots. This accumulated snow builds up in the toe pocket area because the toe pocket area is generally closed and contains the snow in this area. Over time, this snow can build up and freeze which is not desirable. Accordingly, there is a need to provide an improved footrest system that reduces component parts, increases functionality, while providing snow evacuation throughout the footrest system and particularly in the toe pocket area.

SUMMARY

This section provides a general summary of the disclosure, and is not a comprehensive disclosure of its full scope or all of its features.

A footrest system for use on a snowmobile. The footrest system includes a footrest that extends from a first proximal end to a second distal end. A fender covers a proximal portion of the footrest to define a toe pocket. At least one snow evacuation bore passes through the proximal portion of the footrest and the fender. The at least one snow evacuation bore is configured to pass snow out of the toe pocket and through the footrest and fender.

A footrest system for use on a snowmobile. The footrest system includes a footrest extending from a first proximal end to a second distal end. The footrest includes a proximal portion, a distal portion, and an intermediate portion therebetween. A fender covers the proximal portion of the footrest to define a toe pocket. The proximal portion and the intermediate portion are separated by a first plane. The distal portion and the intermediate portion are separated by a second plane. The proximal portion is angled upward relative to the intermediate portion along the first plane. The distal portion is angled upward relative to the intermediate portion along the second plane.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
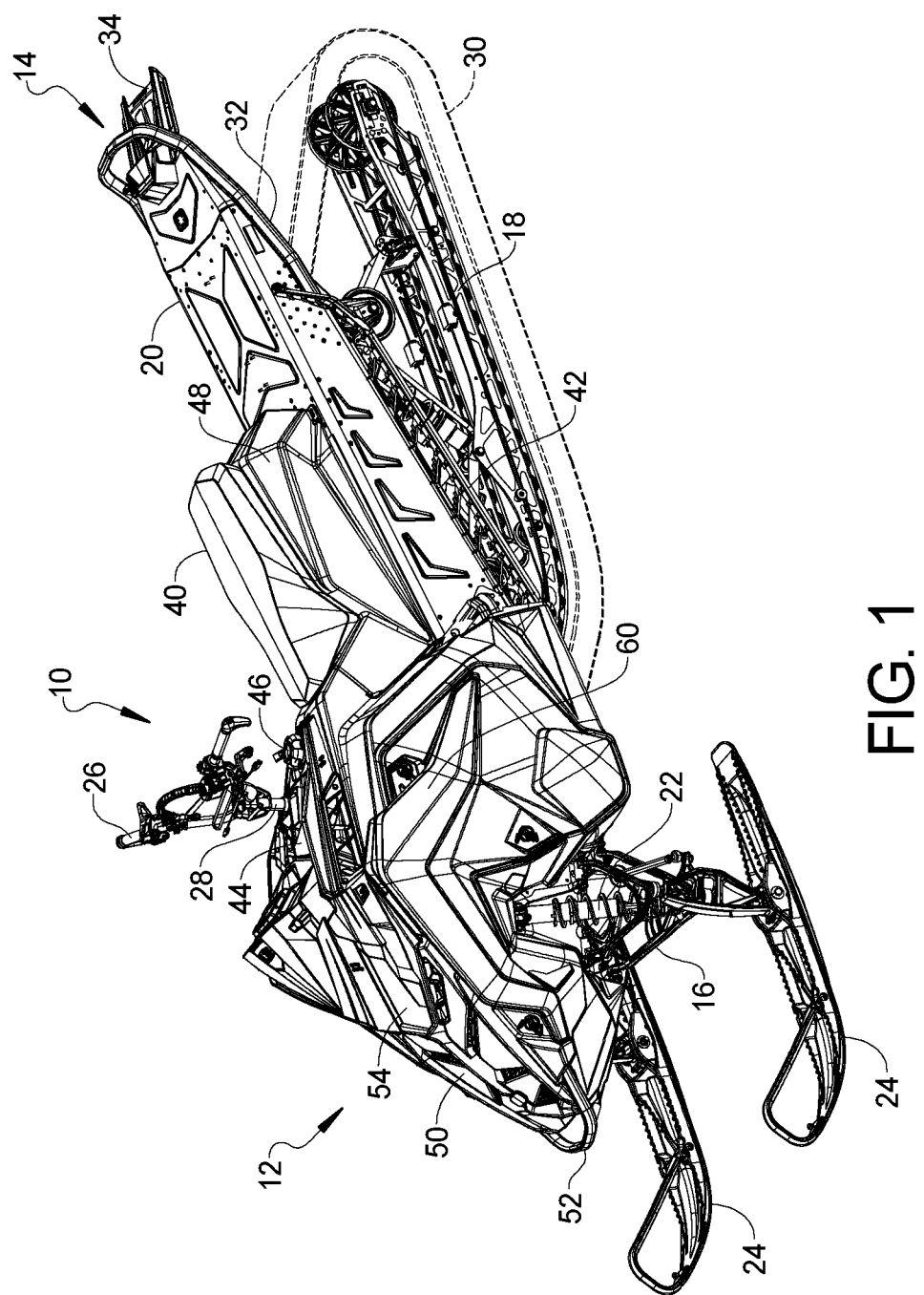
FIG. 1 is a perspective view of an exemplary snowmobile in accordance with the present disclosure.
Figure 2:
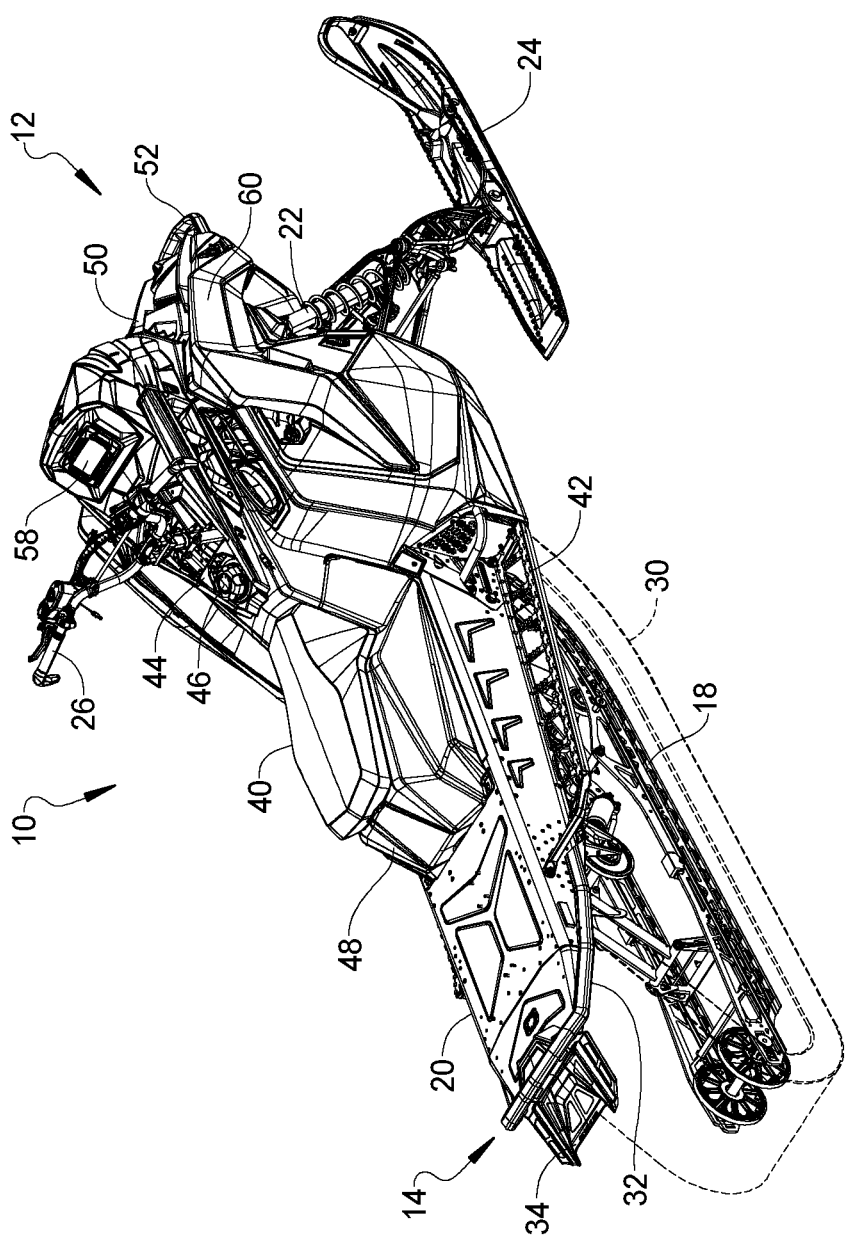
FIG. 2 is another perspective view of the snowmobile of FIG. 1.
Figure 3:
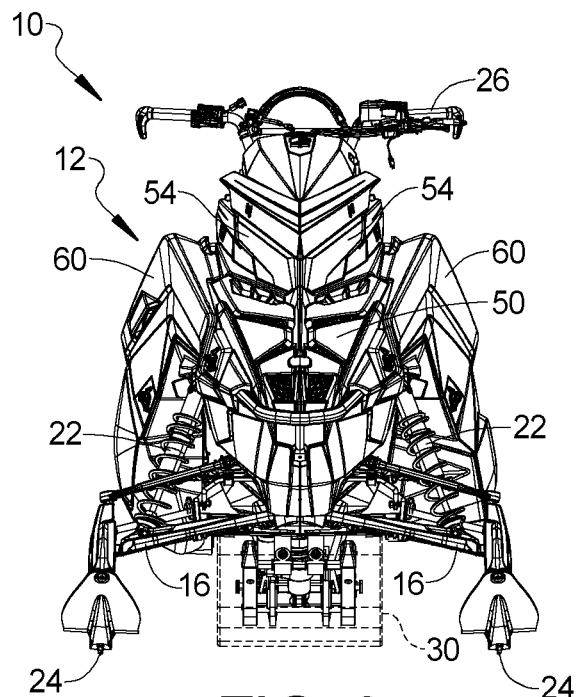
FIG. 3 is a front view of the snowmobile of FIG. 1.
Figure 4:
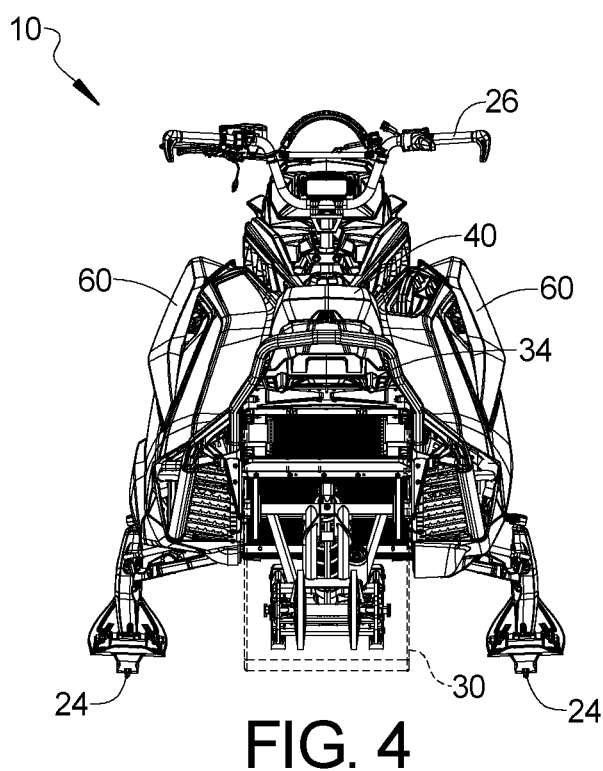
FIG. 4 is a rear view of the snowmobile of FIG. 1.
Figure 5:
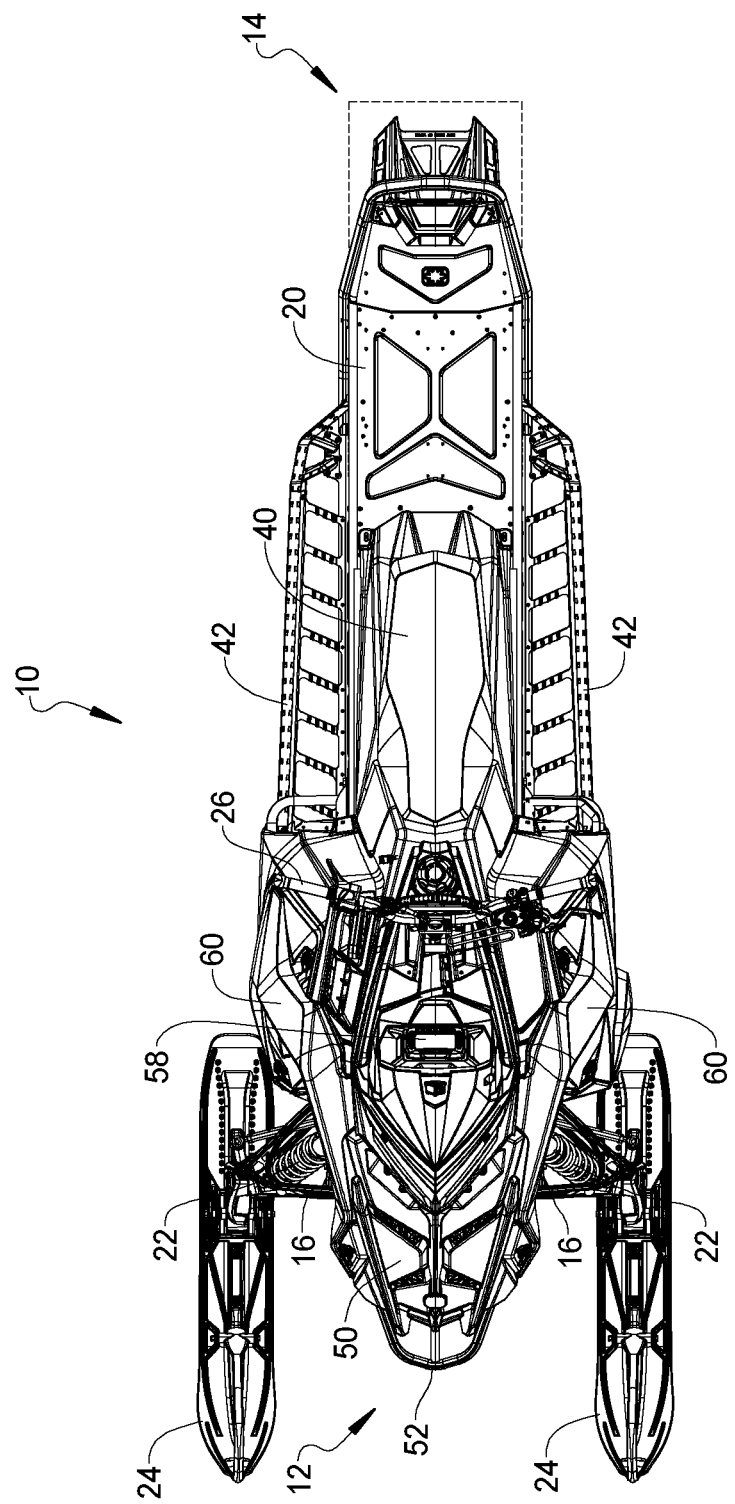
FIG. 5 is a top view of the snowmobile of FIG. 1.

Example embodiments will now be described more fully with reference to the accompanying drawings.

With initial reference to FIGS. 1-6, an exemplary vehicle in accordance with the present disclosure is illustrated. Although the vehicle is illustrated as a snowmobile 10, numerous aspects of the present disclosure may be included with any other suitable vehicle as well. The snowmobile 10 may be any suitable type of snowmobile, such as any suitable trail snowmobile, sport trail snowmobile, touring snowmobile, performance snowmobile, utility snowmobile (such as any snowmobile suitable for search and/or rescue, law enforcement, military operations, etc.), crossover snowmobile, mountain snowmobile, youth snowmobile, etc.

The snowmobile 10 generally includes a front end 12 and a rear end 14. At the front end 12 is a front suspension 16. At the rear end 14 is a rear suspension 18. The front suspension 16 and the rear suspension 18 support a chassis 20.

The front suspension 16 includes shock absorbers 22, each one of which is connected to a ski 24. The shock absorbers 22 may be any dampening devices suitable for absorbing shock resulting from the skis 24 passing over uneven terrain. The skis 24 are steered in part by a suitable steering device, such as handlebars 26.

Coupled to the rear suspension 18 is a belt or track 30, which is an endless or continuous belt or track 30. Rotation of the track 30 propels the snowmobile 10. The track 30 is circulated through a tunnel 32 defined at least in part by the chassis 20. The tunnel 32, as illustrated in FIG. 1, is tapered at the rear end 14. Mounted at the rear end 14 is a flap 34, which blocks snow and other debris from being "kicked-up" by the track 30.

Mounted to the chassis 20 and atop the tunnel is a seat 40 for the operator of the snowmobile 10. On both sides of the chassis 20 or tunnel 32 are footrests or running boards 42, upon which the operator may rest his or her feet when seated on the seat 40. The seat 40 is positioned to allow the driver to grasp the handlebars 26 for steering the snowmobile 10. The handlebars 26 are mounted to a steering rod 28, which protrudes out from within the center console 44. At the center console 44 is a fuel cap 46 of a fuel tank 48. Any suitable accessory 36 (see FIG. 6) may be mounted to the chassis 20 behind the seat 40.

At the front end 12 of the snowmobile 10 is a hood assembly 50, which is mounted on top of a nose pan 68. Mounted to the hood assembly 50 and protruding from a forwardmost end thereof, is a front bumper 52. The hood assembly 50 houses headlights 54. An optional windshield 56 is connected to an uppermost portion of the hood assembly 50, as described in detail herein. Associated with the hood assembly 50 is a display 58 viewable by the operator when seated on the seat 40. Mounted to opposite sides of the hood assembly are body panels 60, which are advantageously interchangeable.

Figure 6:
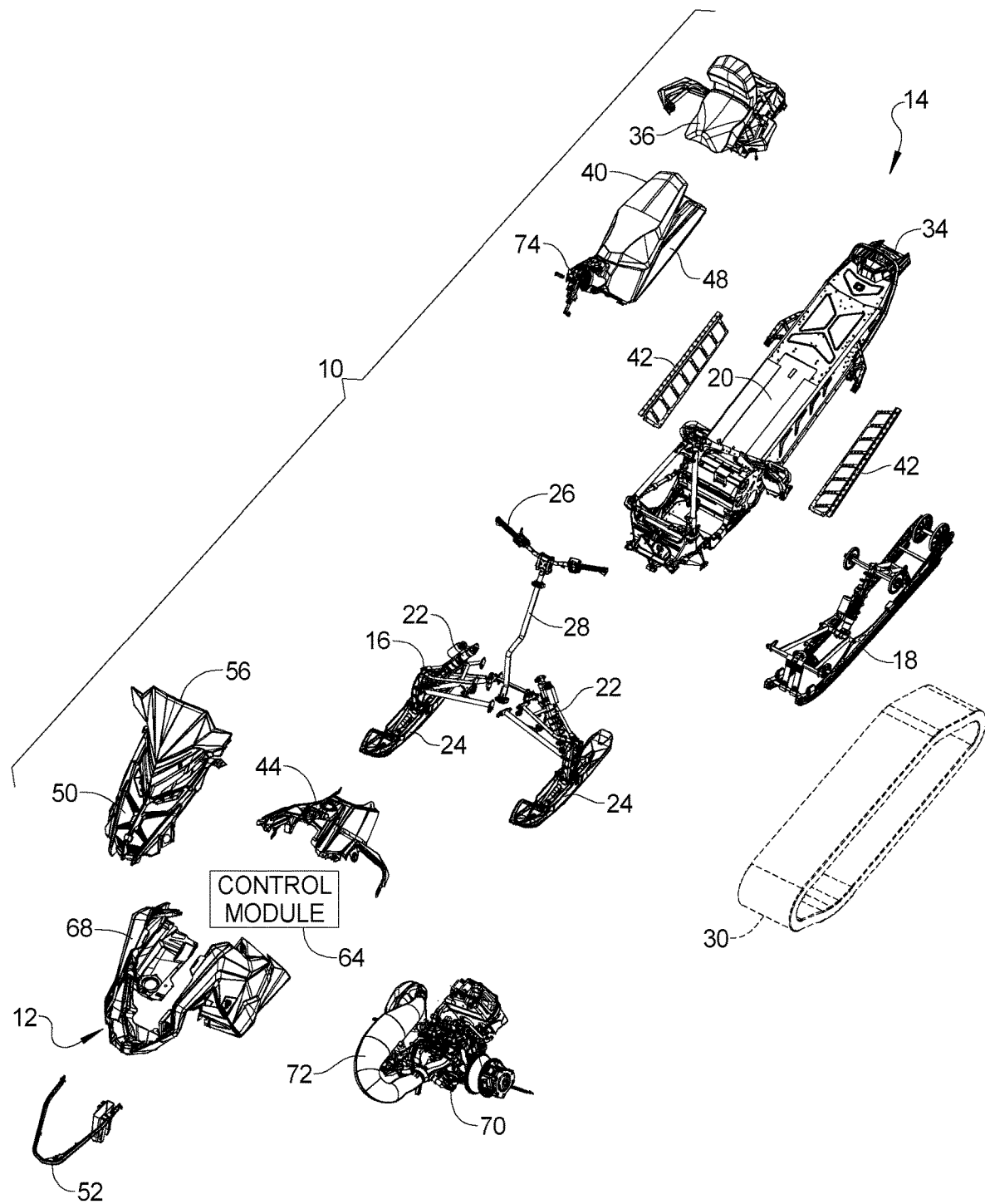
FIG. 6 is an exploded view of the snowmobile of FIG. 1.

With particular reference to FIG. 6, the snowmobile 10 further includes an engine assembly 70. The engine assembly 70 generates power for driving the track 30. The engine assembly 70 may include any suitable engine, such as a two-stroke, four-stroke, or an electric engine. Coupled to the engine assembly 70 is an exhaust assembly 72. Any suitable exhaust assembly may be used. Oil for the engine assembly 70 is stored in an oil tank assembly 74, which may be arranged proximate to the seat 40.

The snowmobile 10 further includes any suitable control module 64. The control module 64 may be arranged at any suitable location, such as within the hood assembly 50, beneath the center console 44, or within any suitable control mounted to the handlebars 26. The term "control module" may be replaced with the term "circuit." The term "control module" may refer to, be part of, or include processor hardware (shared, dedicated, or group) that executes code and memory hardware (shared, dedicated, or group) that stores code executed by the processor hardware. The code is configured to provide the features of the control module described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

Figure 7:
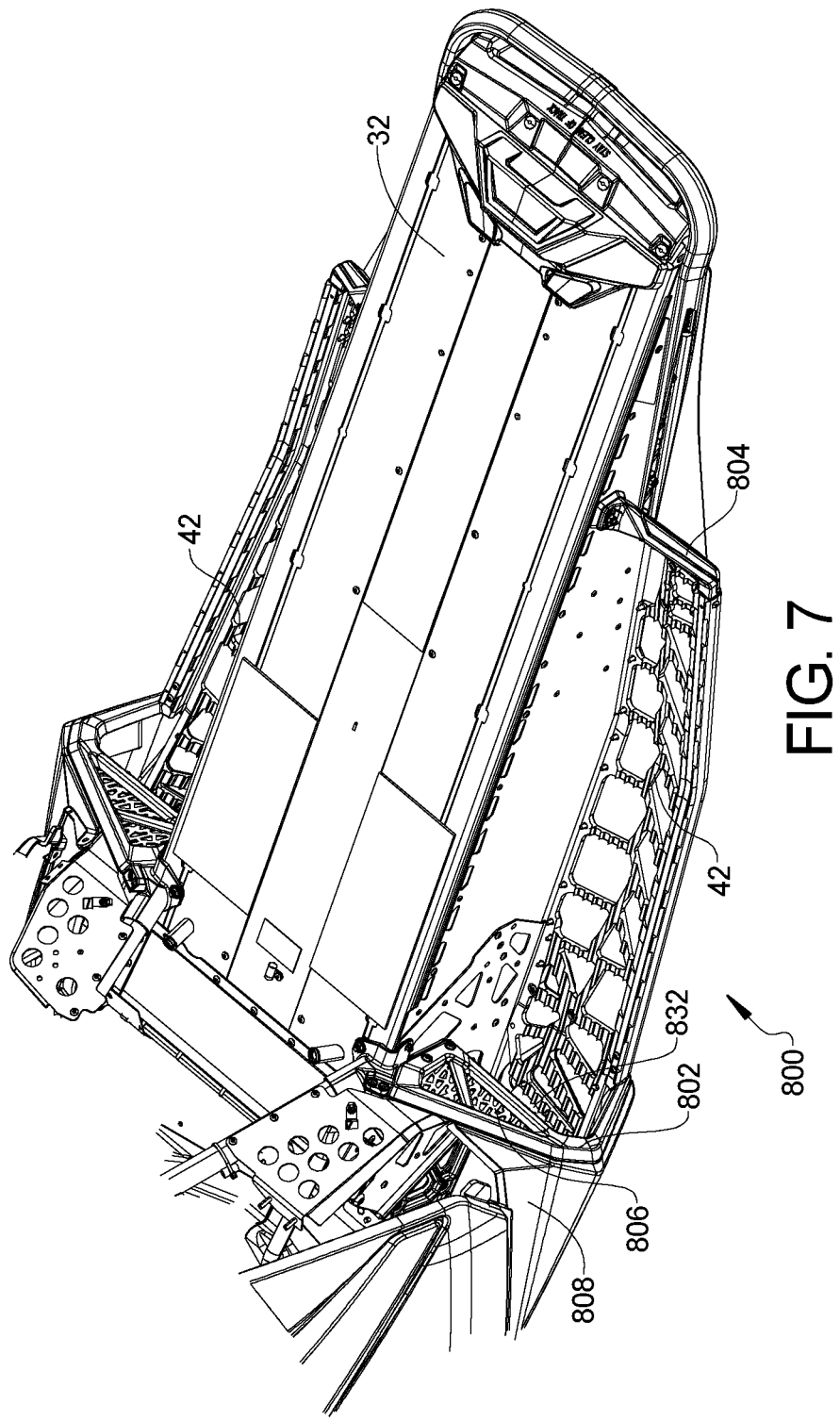
FIG. 7 is a perspective view illustrating a footrest system of the present disclosure.
Figure 8:
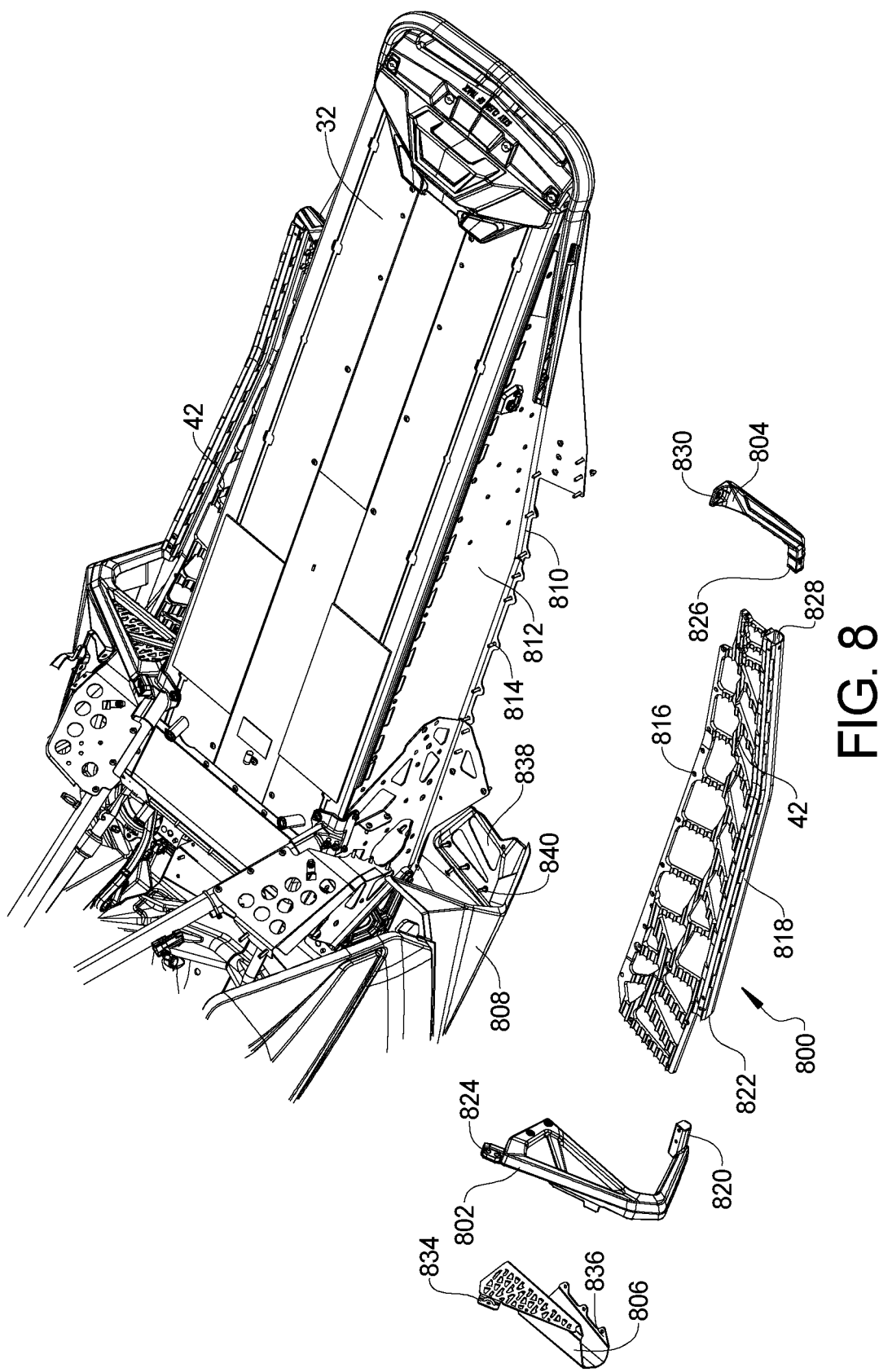
FIG. 8 is an exploded perspective view of the footrest system of the present disclosure.
Figure 9:
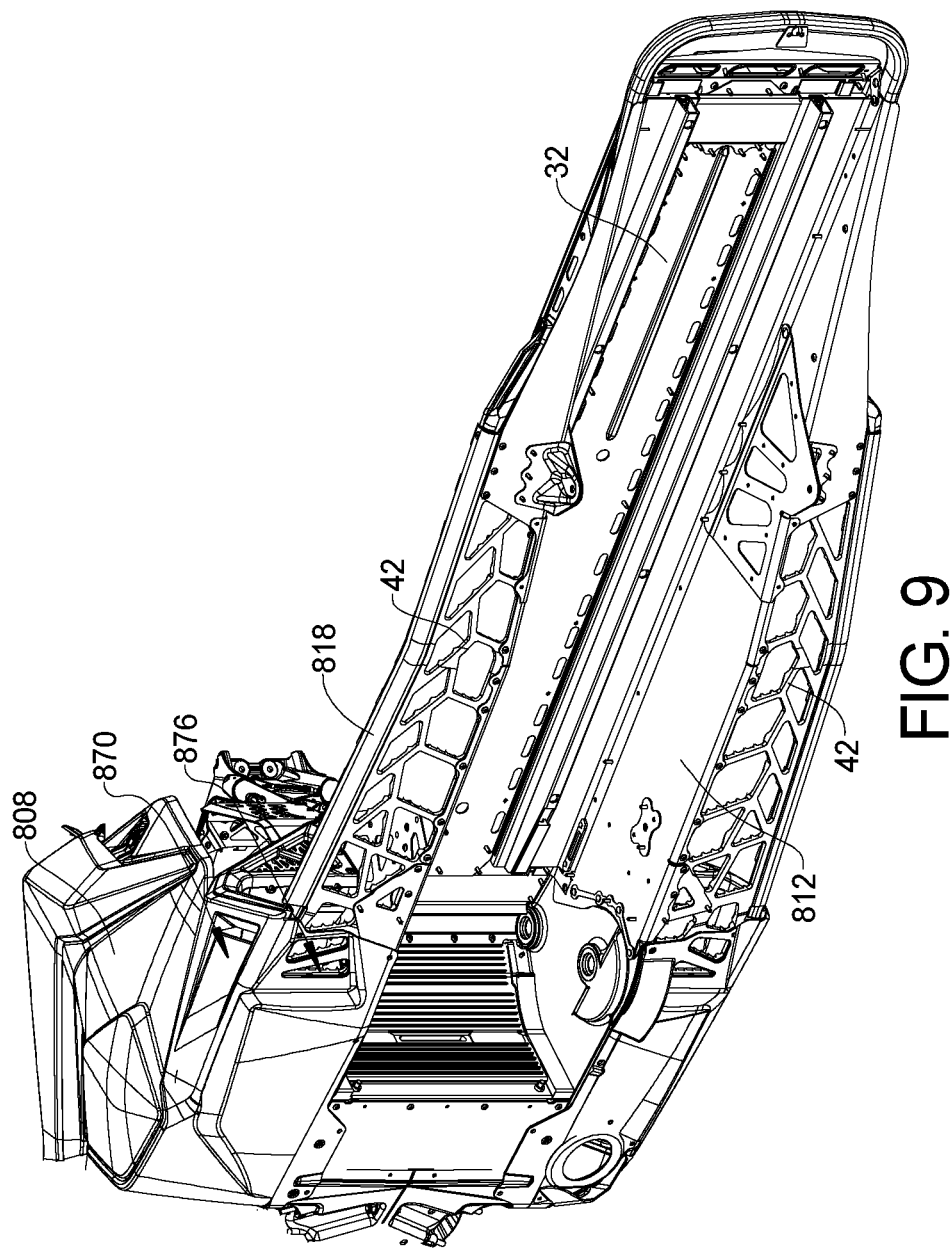
FIG. 9 is an underside perspective view of the footrest system.
Figure 10:
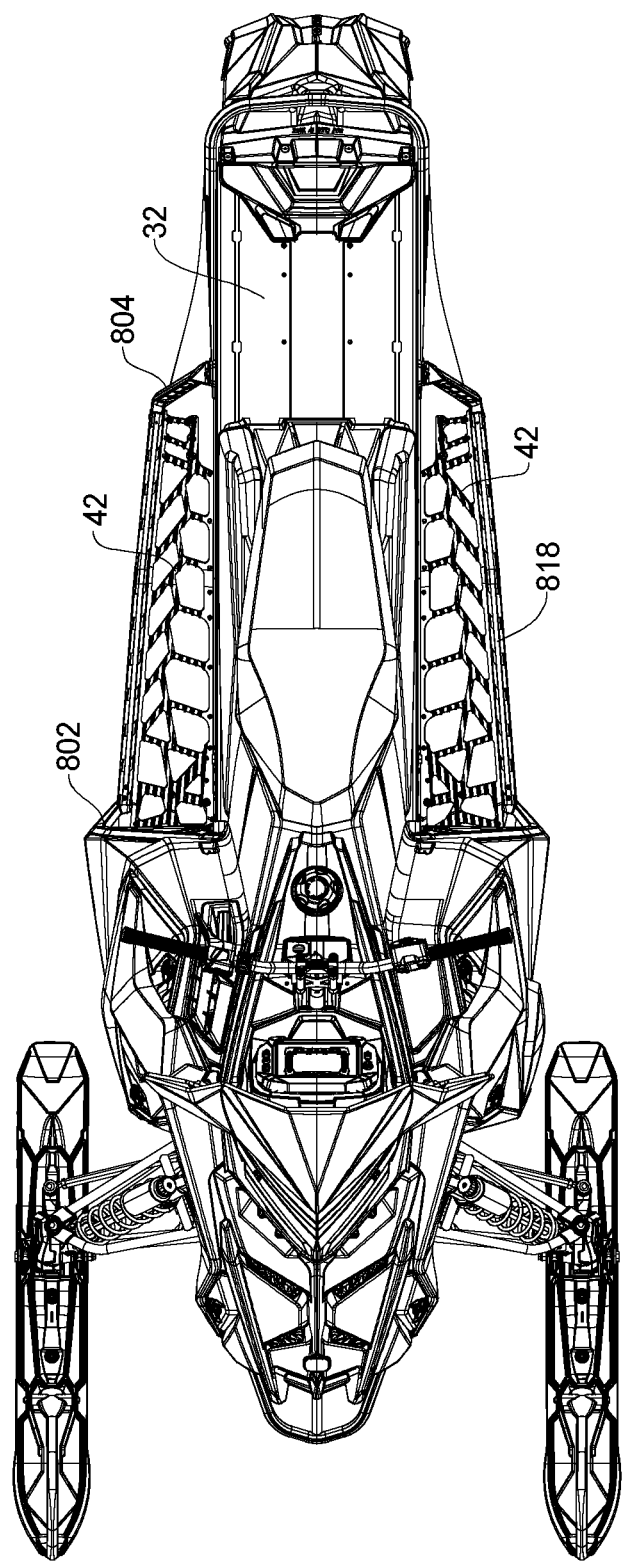
FIG. 10 is a top planar view of the footrest system.
Figure 11:
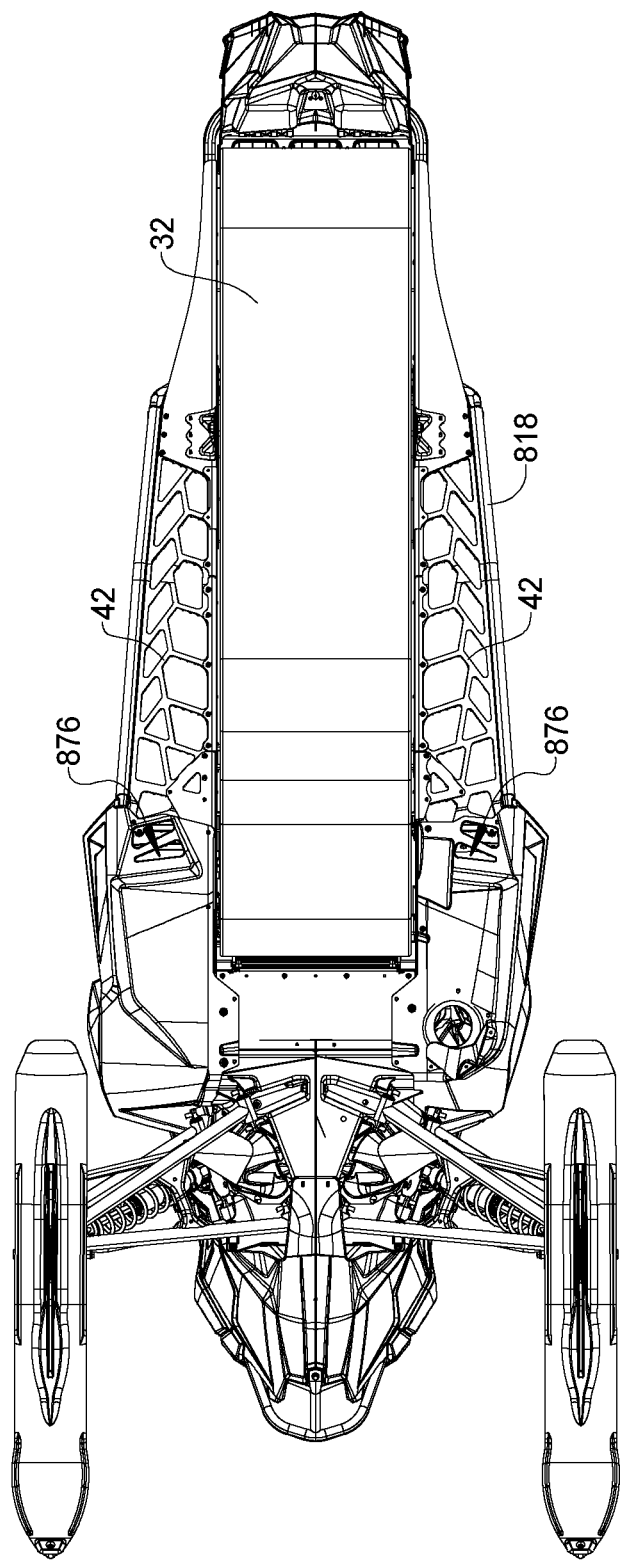
FIG. 11 is an underside planar view of the footrest system.

Turning to FIGS. 7 and 8, the footrest system 800 is illustrated assembled and in exploded view, respectively. The footrest system 800 is illustrated in FIGS. 7 and 8 with a view of a left side footrest or running board 42 with the understanding that the right side of the footrest system 800, partially illustrated in FIGS. 7 and 8 is substantially similar to the left side with similar reference numerals used. The footrest system 800 includes a pair of footrests or running boards 42, a front support bracket 802 and a rear support bracket 804. Coupled to the front support bracket 802 and the footrest 42 is a toe plate 806. A fender 808 additionally forms a part of the footrest system 800, further discussed herein.

The footrest system 800 is attached to the chassis 20 of the snowmobile 10 and particularly the tunnel 32. As illustrated, the tunnel 32 is illustrated with a non-tapered distal end, however, the footrest system 800 can be employed with the tunnel 32 illustrated in FIGS. 1-6 having the tapered distal end as well. Each footrest 42 is attached to a flange 810 that extends from a side wall 812 on each side of tunnel 32. The footrest 42 is attached by way of rivets 814 or other appropriate fasteners such as screws, pins, etc. As illustrated in FIG. 8, the footrest 42 includes a plurality of bores 816 that pass through the footrest 42 to receive the plurality of rivets 814. The footrest 42 is formed from an extruded aluminum and the tunnel 32 is also formed from aluminum or other appropriate materials. The front support bracket 802 is a cast aluminum component that provides structural rigidity and support of the footrest 42 relative to the tunnel 32. The front support bracket 802 is coupled to both the tunnel 32 as well as an outer rail portion 818 of the footrest 42. In this regard, a male mating portion 820 is slidably received into a female end 822 of the outer rail 818 and rivets are used to attach the front support bracket 802 to the tunnel 32 at mounting end 824. Similarly, the rear support bracket 804 includes a male portion 826 that is slidably received in female portion 828 with mounting end 830 coupled to the tunnel 32 by way of rivets or other fasteners. The rear support bracket 804 is also a cast aluminum component to provide further structural rigidity of the footrest 42 relative to the tunnel 34.

The toe plate 806 is a sheet metal component that is coupled to both the footrest 42 and the first support bracket 802 and provides an area in a toe pocket 832 for protecting the drivers distal most portion of their boot or foot. The toe pocket 832 extends proximally toward the front end 12 of the snowmobile 10 and is defined as the area within the fender 808 forward a plane at the bracket 802, further discussed herein. As illustrated, a top portion 834 of toe plate 806 is riveted to the front support bracket 802 and a lower portion 836 of the toe plate 806 is attached adjacent to an open area 838 formed in the fender 808, further discussed herein. The top portion 834 and the bottom portion 836 are also attached in these areas by way of rivets or other appropriate fasteners 840.

Figure 12:
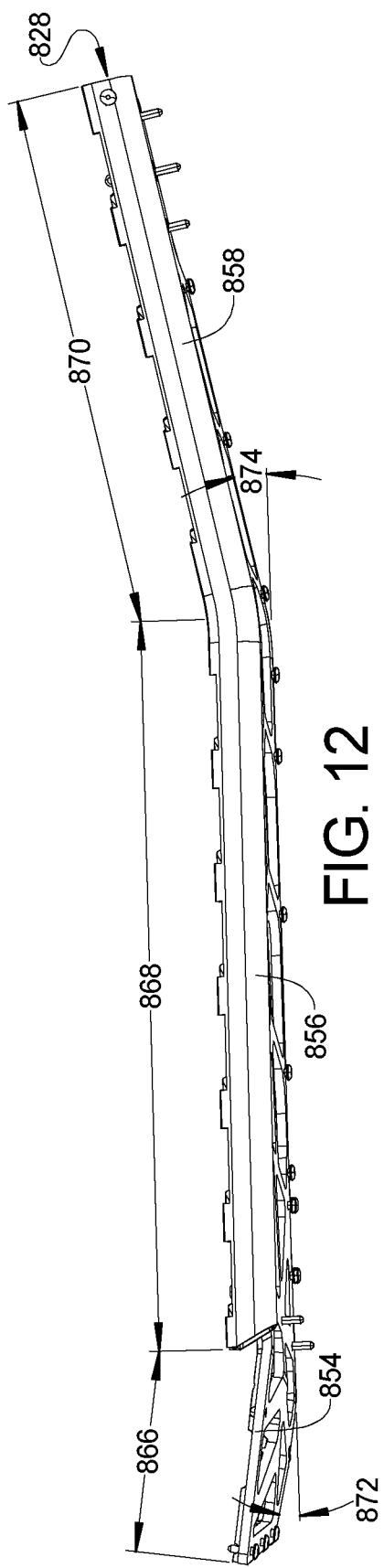
FIG. 12 is a side view of a running board of the footrest system.
Figure 13:
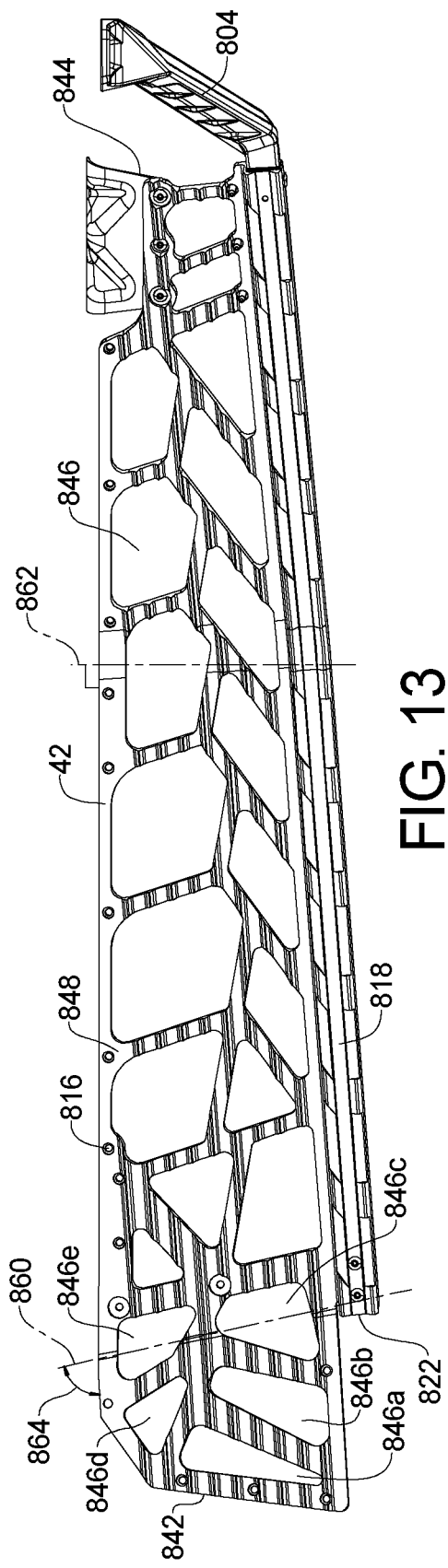
FIG. 13 is a top planar view of the running board of the footrest system.
Figure 14A:
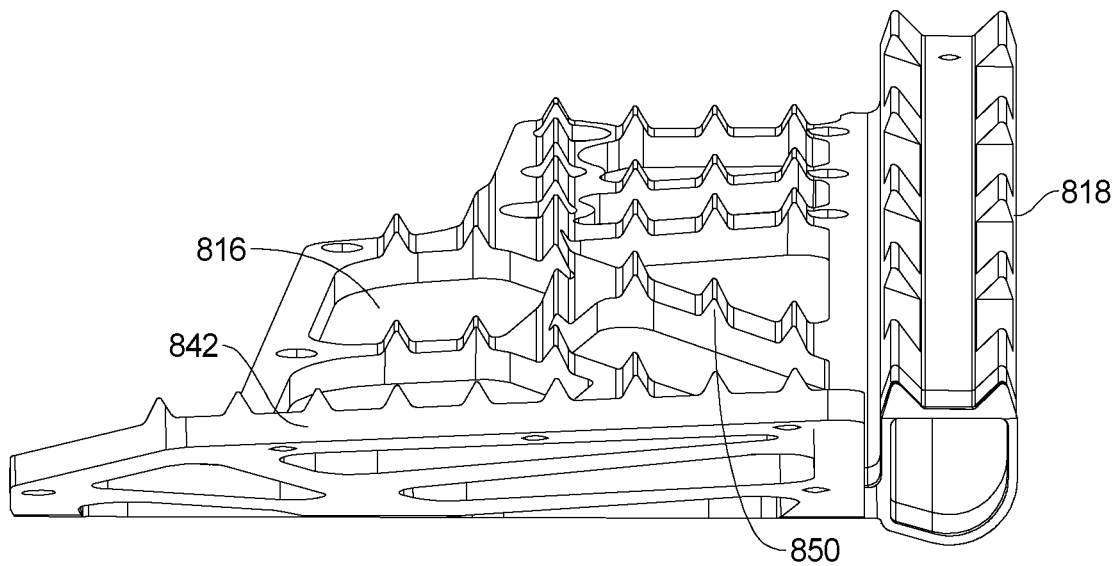
FIG. 14A is a proximal end view of the running board of the footrest system.
Figure 14B:
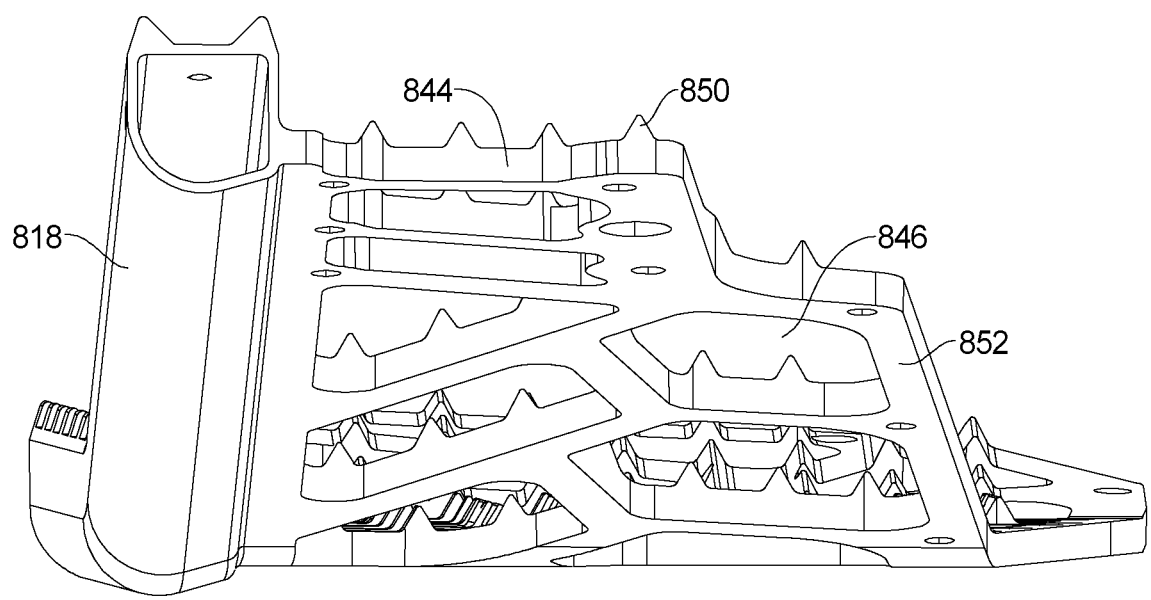
FIG. 14B is a distal end view of the running board of the footrest system.

Turning to FIGS. 12-14B, the left side footrest or running board 42 is illustrated in detail with the understanding that the right side footrest is a mirror image of the left side. The footrest 42 is a one-piece integral or monolithic structure that extends from a first proximal end 842 to a second distal end 844. The width of the running board tapers transversely from the first proximal end to the second distal end, as illustrated in FIG. 13. In this regard, the width at the first proximal end 842 is larger than the width of the second distal end 844. As previously noted, the footrest 42 is formed from an extruded aluminum that includes a plurality of holes or bores cut through the extruded aluminum to provide passages through the running board along its entire length. The surface area of the bores or holes 846 passing through the footrest 42 are greater than 50% of the overall surface area illustrated in FIG. 13, in order to substantially reduce weight, as well as provide passage for debris, such as snow, throughout. Extending from an upper surface 848 of the footrest 42 are a plurality of protrusions or ridges 850 that extend substantially perpendicular to a plane of the footrest 42. Ridges 850 provide texture to the upper surface 848 so that an occupant's feet or boots do not slide on the running board 42. An under surface 852 of the running board 42 is substantially smooth, as illustrated in FIGS. 14A-14B.

The running board 842 includes three distinct portions, a proximal portion 854, an intermediate portion 856, and a distal portion 858. The proximal portion 854 and the intermediate portion 856 are separated along a first plane 860 and the intermediate portion 856 and the distal portion 858 are separated along second plane 862. The first plane 860 extends from the tunnel 32 at an angle of about 78°, identified by reference numeral 864. The second plane 862 extends substantially perpendicular or orthogonal from the sidewall 812 of the tunnel 32. The proximal portion 854 extends along a length of about 107 mm, identified by reference numeral 866. The intermediate portion 856 extends a length of about 448 mm, identified by reference numeral 868. The distal portion 858 extends along a length of about 364 mm, identified by reference numeral 870. The proximal portion 854 angles upward relative to a plane of the intermediate portion 856 at an angle of about 8.2°, identified by reference numeral 872. The distal portion 858 angles upward from the plane defined by the intermediate portion 856 by an angle of about 11.9°, identified by reference numeral 874. The front portion 854 is angled upward to provide ergonomic support for an occupant's foot, as well as provide additional clearance in the fender 808, further discussed herein. The distal portion 858 angles upward to follow the tapered distal portion of sidewall 812. Additionally, the angle 872 in the proximal end 854 also helps prevent snow from entering the snow pocket 832, also discussed herein.

Figure 15:
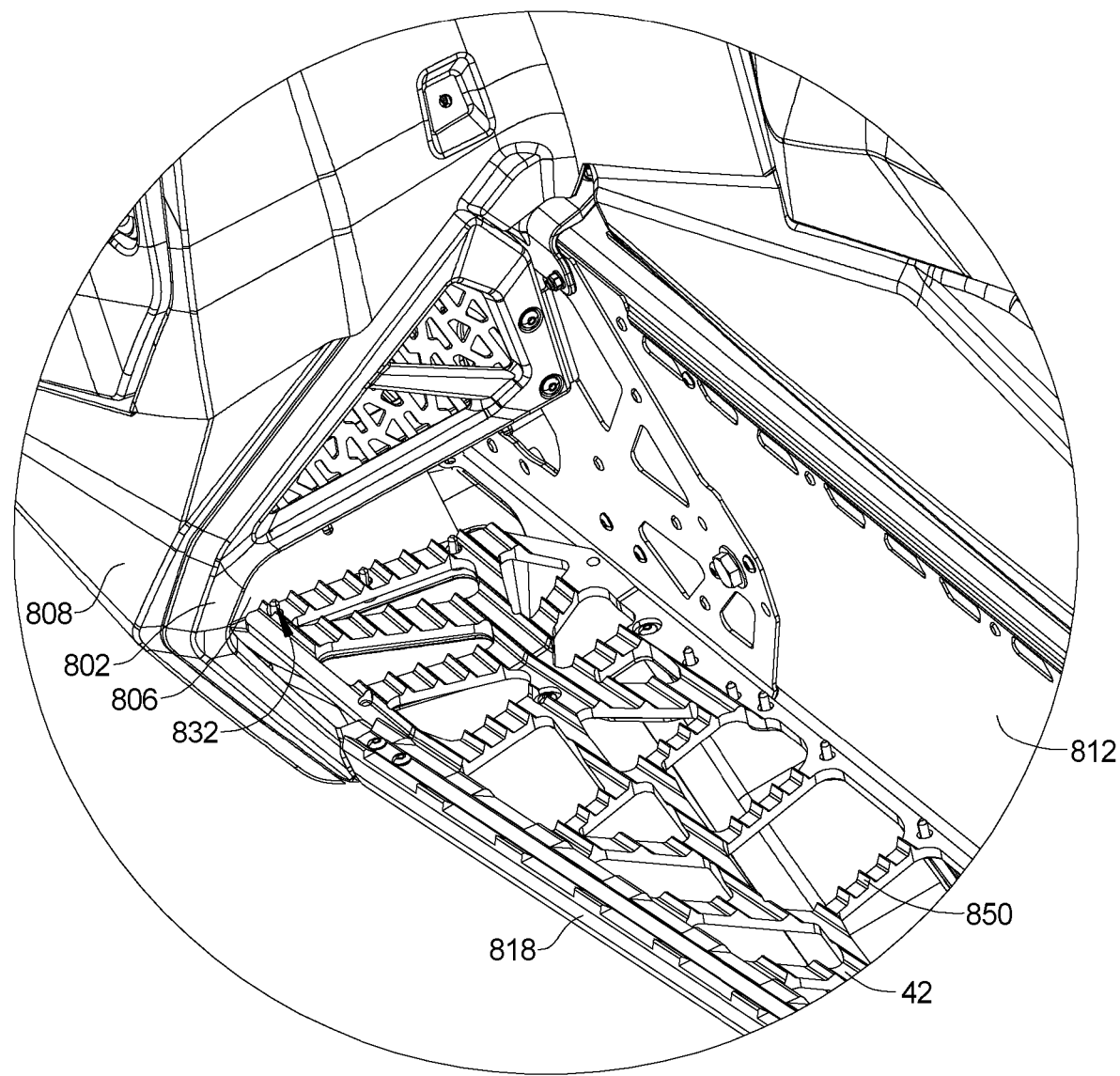
FIG. 15 is an enlarged perspective view of a left side of the footrest system.
Figure 16:
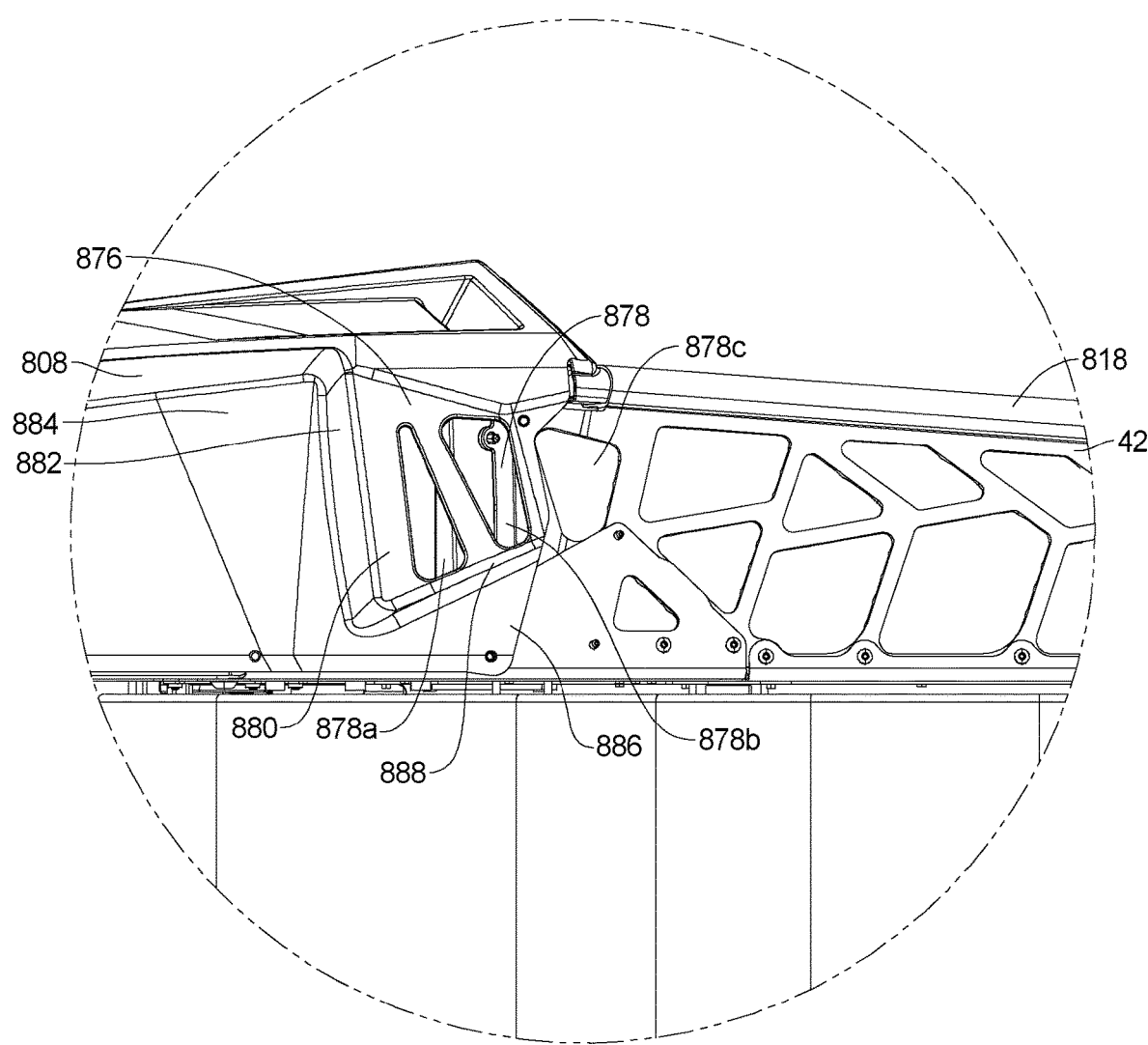
FIG. 16 is an enlarged underside view of the left side of the footrest system.
Figure 17:
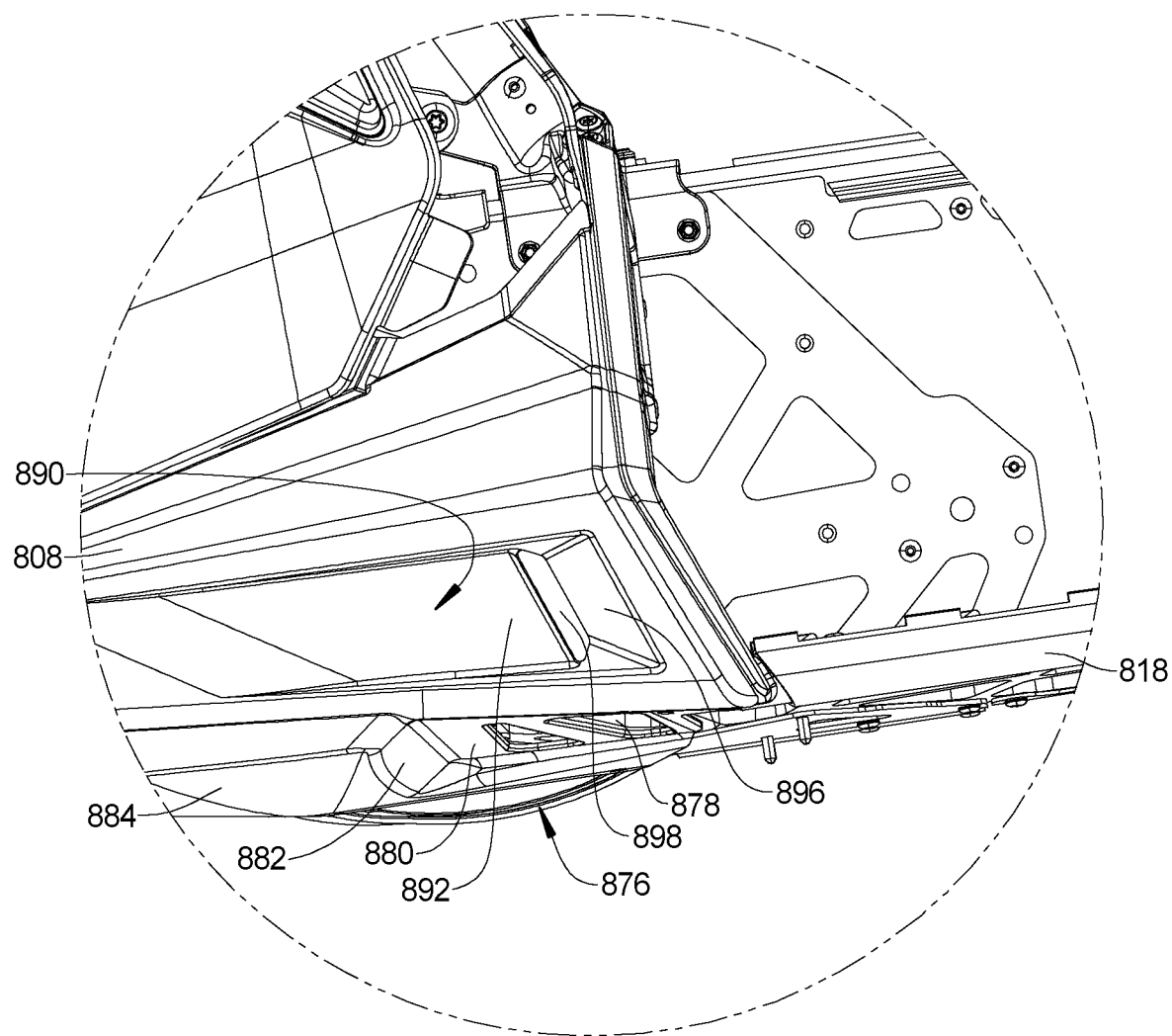
FIG. 17 is an enlarged side view of the left side of the footrest system.
Figure 18:
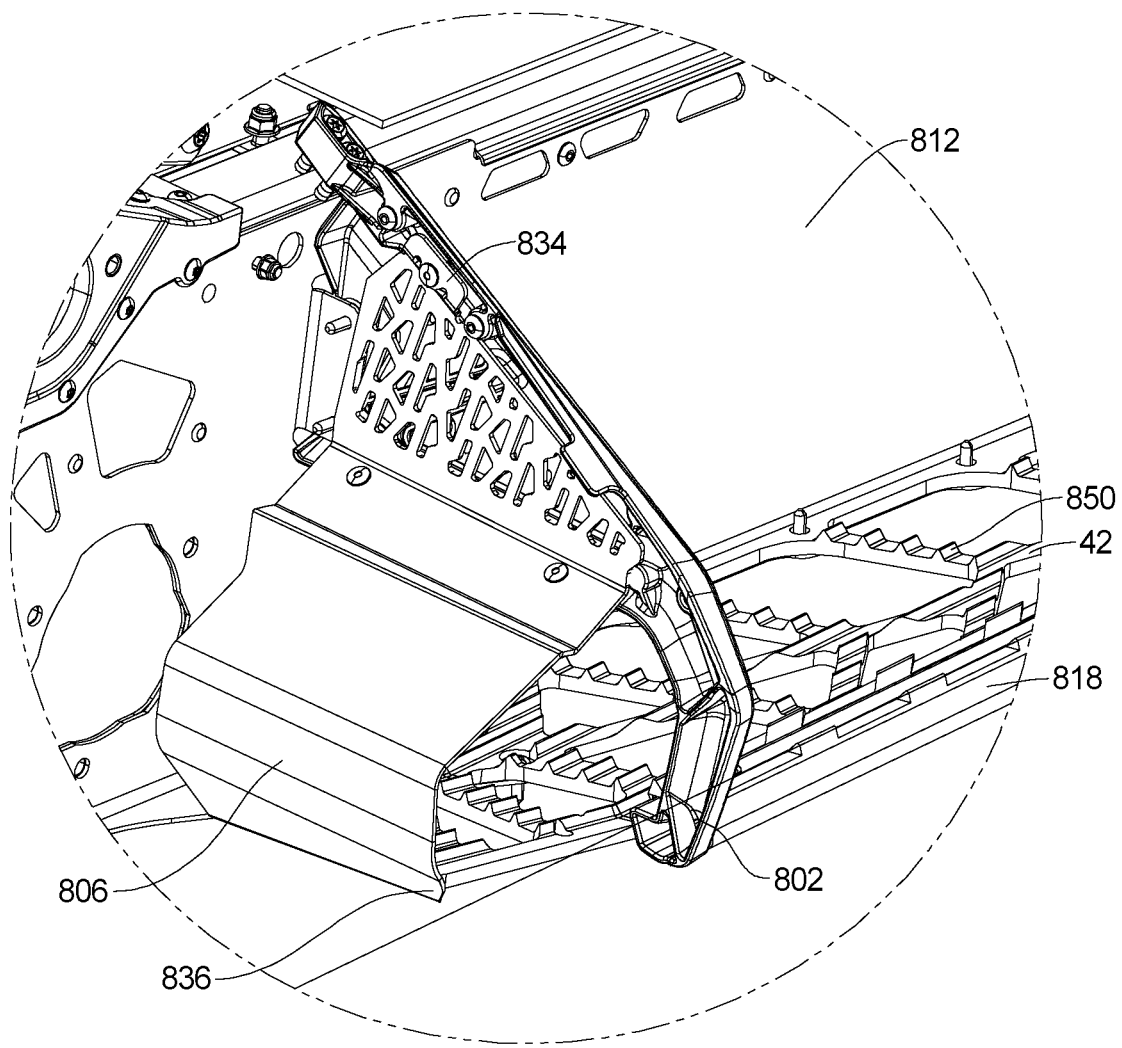
FIG. 18 is an enlarged left side perspective view of the footrest system with the fender removed.
Figure 19:
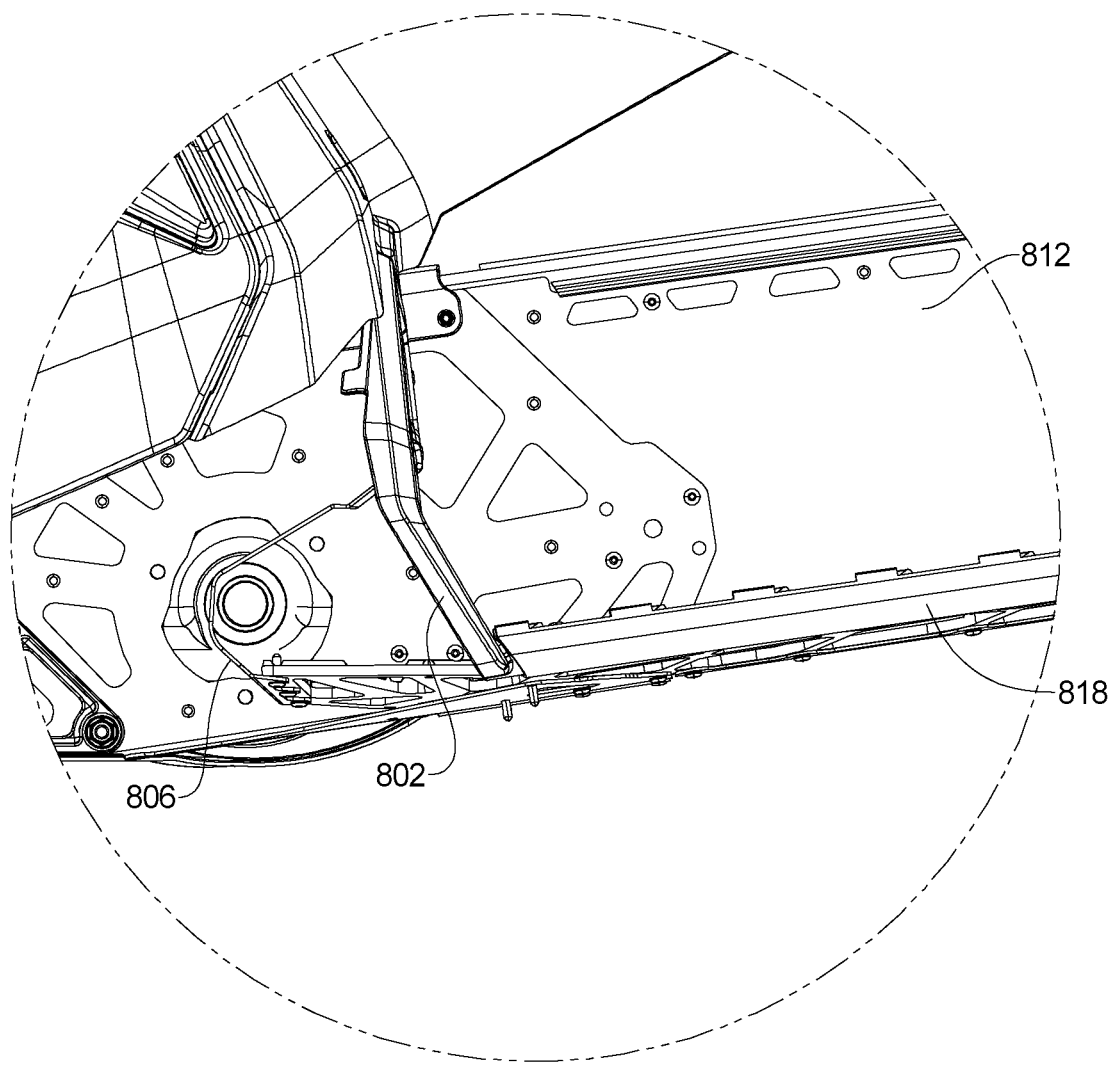
FIG. 19 is a side view of the left side of the footrest system with the fender removed.

Referring to FIGS. 15-21B, the toe pocket 832 is illustrated in further detail. The toe pocket 832 begins at the first plane 860 of the footrest 42 and extends proximally the snowmobile 10 into the fender well portion of the fender 808. As illustrated in FIG. 15, the front support bracket 802 defines the first plane 860. The fender 808 includes two snow deflection portions. As illustrated in FIGS. 16-17, a first snow deflection portion 876 is illustrated. The first snow deflection portion 876 is positioned adjacent or relative to a plurality of holes or bores 878 that pass through the fender 808. The bores 878 are snow evacuation bores that align and match the corresponding snow evacuation bores 846 in the proximal portion 854 of the running board or footrest 42. By providing the snow evacuation boards 878 through the fender 808 that correspond to the bores 846 in the footrest 42, snow that would normally be trapped in the toe pocket 832 can be evacuated through the bores 846 and 878. In other words, snow can be evacuated through both the footrest 42 and the fender 808. Should other portions of the chassis or sheet metal reinforcements pass through this area, these layers would also include additional corresponding bores having the same size and shape to enable a snow evacuation passthrough throughout the assembly in the toe pocket 832. This prevents snow buildup, as well as ice forming, in this area.

By angling the proximal portion 854 upward, as illustrated in FIG. 12, this enables the first snow deflection portion 876 to include a corresponding recess 880 that follows the upward angling of the proximal portion 854. This provides for a height differential defined by an angled front wall 882 that extends to lower portion 884 of fender 808. This height differential of the two surfaces provided by way of the upturned proximal portion 854 enables the corresponding height differential between the lower wall 884 and the recess 880 having the front angled wall 882 therebetween. Thus, as the snowmobile 10 is traversing, snow will hit and engage the lower surface or wall 884 and simply fly past the recess 880 and the angled front wall 882, thereby preventing snow from being thrown up into the snow evacuation bores 878 of the fender 808 and the bores 846 of the footrest 42. Thus, the first snow deflection portion 876 enables bores to be positioned completely through the toe pocket 832 without allowing snow to be thrown up through the bores 878 and 846. Additionally, as long as a height differential exists between a surface of the fender, identified as surface 884, and a plane of the footrest 42, identified as surface 880, where the surface 884 is extending below surface 880, snow will hit surface 884 and go past surface 880 that is above surface 884 and, thus, not direct snow onto the footrest 42. The surface 884 can be angled away from surface 880 or be parallel to surface 880, as long as a height differential exists between the surfaces for snow deflection.

As illustrated in FIG. 16, there are two complete bores 878 that mate with bores 846 and a partial bore that bisects the front support bracket 802. In this regard, bores 878a and 878b are complete bores that match up with bores 846a and 846b. Bore 878c corresponds with bore 846c and is bisected by first plane 860. Bores 846d and 846e are covered by the lower surface 884 in the boundary area 886 of fender 808. This angled boundary area 886 also includes a sidewall 888 that extends into recess 880. By providing the boundary area 886, further rigidity in both the fender 808 and the running board or footrest 42 is achieved, as well as further directing snow away from the area adjacent the track 30 that throws and accumulates substantial snow in this area.

Figure 20A:
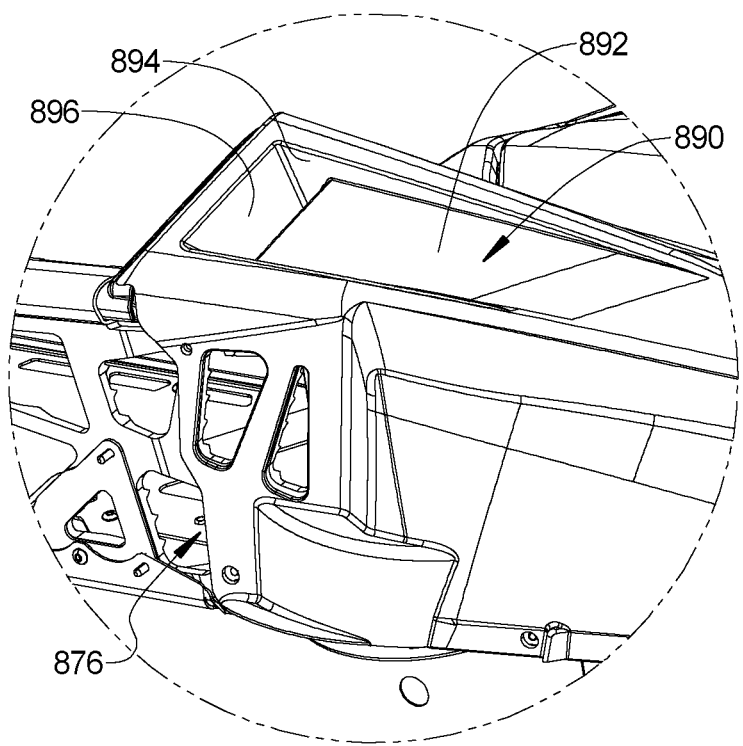
FIG. 20A is an enlarged underside view of the right side of the footrest system.
Figure 20B:
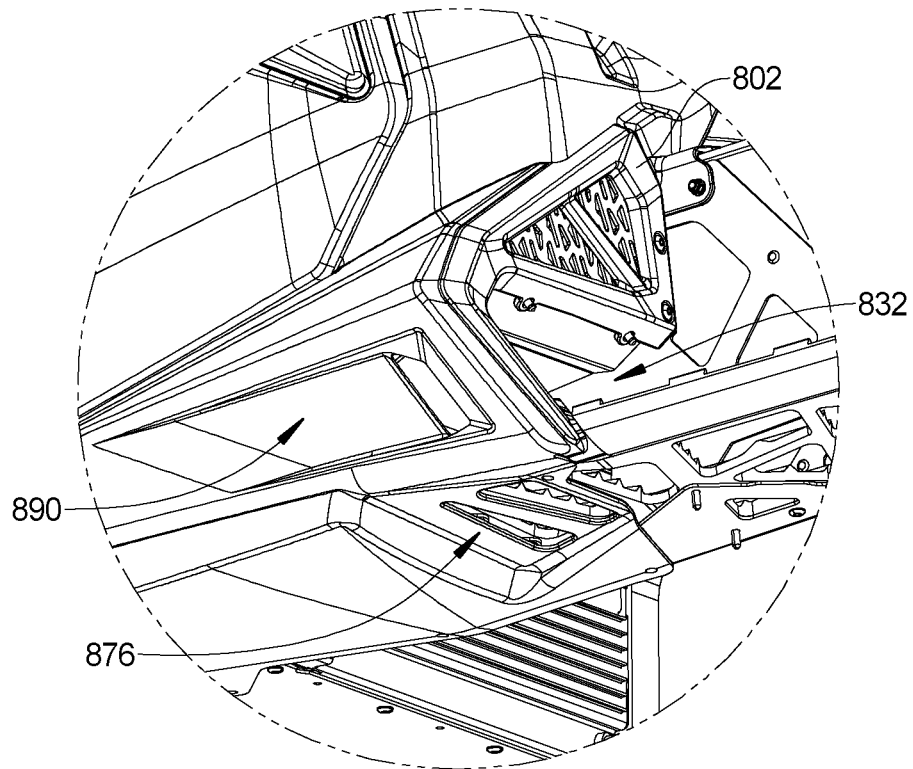
FIG. 20B is an enlarged underside view of the left side of the footrest system.
Figure 21A:
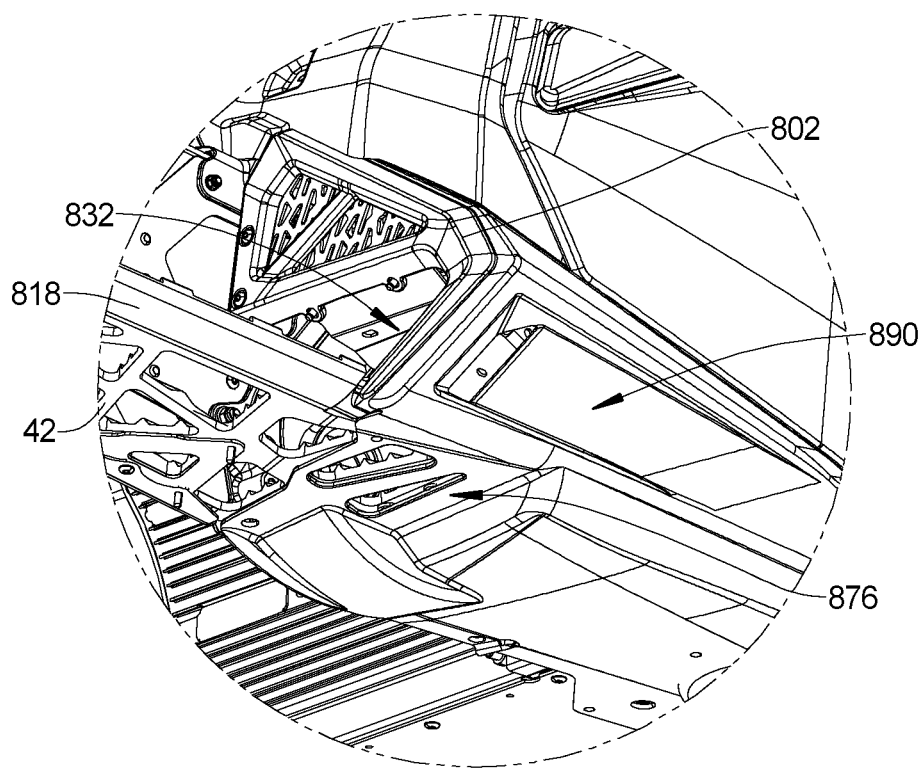
FIG. 21A is an enlarged perspective view of the right side of the footrest system.
Figure 21B:
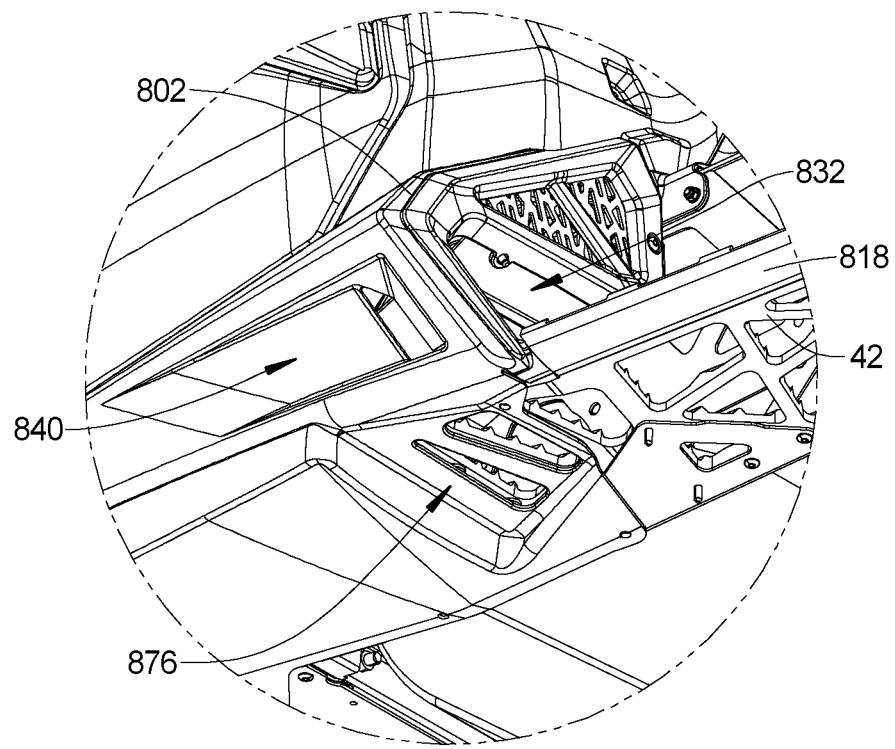
FIG. 21B is an enlarged perspective view of the left side of the footrest system.

A second snow deflection portion 890 is clearly illustrated in FIG. 17. Second snow deflection portion 890 includes a recessed surface 892 formed in a lower side portion of the fender 808. Recess 892, as illustrated in FIG. 20A, tapers inwardly as the recess 892 extends distally. This defines a tapered boundary sidewall 894. The distalmost portion of sidewall 894 extends into the fender 808 via rear sidewall 896 to define an opening 898 through fender 808. The recess 892 has a deflection surface 890 that extends from an outer portion of the fender 808 proximally and is deeper distally. This deflection surface 890 enables snow to be passed along surface 890 and deflected out and away from the toe pocket 832 by way of the rear sidewall 896, which deflects snow out and away from fender 808. Opening 898 also enables snow evacuation in this inside region of the fender 808, as well.

As previously noted, the left and right sides are substantially mirror images of one another and the corresponding features noted above exist in both the left and right sides. The snow evacuation bores 846a, 846b, and 846c, as well as 878a, 878b, and 878c, enable snow to pass from an upper surface of the footrest 42 all the way through the assembly and out the snowmobile 10 through the fender 808. This substantially reduces or eliminates buildup of snow or ice in the toe pocket 832. The first snow deflection portion 876 also deflects snow away from these bores because of the upturned angle 872 of the proximal portion 854 of the running board 42. This prevents snow from being diverted or directed into the snow pocket 832 from the undersurface of the snowmobile 10. The second snow deflection portion 890 further deflects snow away from the toe pocket 832, as well as venting and providing snow evacuation through opening 898. Such a footrest system 800 reduces or eliminates several disadvantages, as noted above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A footrest system for use on a snowmobile, the footrest system comprising:
   a footrest extending from a first proximal end to a second distal end;
   a fender covering a proximal portion of the footrest to define a toe pocket; and
   at least one snow evacuation bore passing through both the proximal portion of the footrest and the fender;
   wherein the at least one snow evacuation bore is configured to pass snow out of the toe pocket and through both the footrest and the fender.

2. The footrest system of claim 1, wherein the footrest includes the proximal portion, a distal portion, and an intermediate portion between the proximal and distal portions.

3. A footrest system for use on a snowmobile, the footrest system comprising:
   a footrest extending from a first proximal end to a second distal end;
   a fender covering a proximal portion of the footrest to define a toe pocket; and
   at least one snow evacuation bore passing through the proximal portion of the footrest;
   wherein the at least one snow evacuation bore is configured to pass snow out of the toe pocket and through the footrest;
   wherein the footrest includes the proximal portion, a distal portion, and an intermediate portion between the proximal and distal portions;
   wherein the proximal portion angles upward relative to the intermediate portion and the distal portion angles upward relative to the intermediate portion.

4. The footrest system of claim 3, wherein the proximal portion angles upward at an angle of about 8° and the distal portion angles upward relative to the intermediate portion at about 12°.

5. The footrest system of claim 1, wherein the footrest defines a plurality of bores passing through the footrest wherein a surface area of the plurality of bores is greater than 50% of the surface area of the footrest.

6. The footrest system of claim 1, wherein the at least one snow evacuation bore includes a plurality of snow evacuation bores passing through the footrest and the fender.

7. The footrest system of claim 1, further comprising a front support bracket and a rear support bracket, the front and rear support brackets configured to rigidly support the footrest relative to a tunnel of the snowmobile.

8. The footrest system of claim 7, wherein the footrest is formed of extruded aluminum and the front support bracket and the rear support bracket are formed from cast aluminum.

9. The footrest system of claim 1, wherein the proximal portion of the footrest is angled up to provide a clearance for a first snow deflection portion formed in the fender adjacent the snow evacuation bore passing through the footrest and fender.

10. A footrest system for use on a snowmobile, the footrest system comprising:
    a footrest extending from a first proximal end to a second distal end;
    a fender covering a proximal portion of the footrest to define a toe pocket; and
    at least one snow evacuation bore passing through the proximal portion of the footrest;
    wherein the at least one snow evacuation bore is configured to pass snow out of the toe pocket and through the footrest;
    wherein the fender includes a first snow deflection portion formed in the fender having a recess formed around the at least one snow evacuation bore to enable snow to pass over the at least one snow evacuation bore without entering the toe pocket.

11. The footrest system of claim 9, further comprising a second snow deflection portion formed into a sidewall of the fender adjacent the toe pocket.

12. The footrest system of claim 11, wherein the second snow deflection portion includes a tapered recess that deflects snow away from the toe pocket.

13. The footrest system of claim 12, wherein the tapered recess further defines a bore passing therethrough and configured to evacuate snow.

14. The footrest system of claim 1, wherein the footrest is formed as a single piece integral footrest that extends from the first proximal end to the second distal end with the first proximal end having the proximal portion that extends into the toe pocket.

15. The footrest system of claim 1, wherein the footrest tapers from a first width at the first proximal end to a second width at the second distal end, wherein the first width is greater than the second width.

16. The footrest system of claim 1, wherein the footrest includes a plurality of ridges extending along a foot engaging surface.

17. A footrest system for use on a snowmobile, the footrest system comprising:

a footrest extending from a first proximal end to a second distal end, the footrest having a proximal portion, a distal portion, and an intermediate portion therebetween;

the proximal portion and the intermediate portion separated by a first plane;

the distal portion and the intermediate portion separated by a second plane;

the proximal portion angled upward relative to the intermediate portion along the first plane; and the distal portion angled upward relative to the intermediate portion along the second plane.

18. The footrest system of claim 17, further comprising a fender covering the proximal portion of the footrest to define a toe pocket.

19. The footrest system of claim 18, further comprising a snow evacuation bore in the toe pocket and passing through the footrest and the fender.

20. The footrest system of claim 19, wherein the snow evacuation bore includes a plurality of snow evacuation bores formed in the proximal portion of the footrest and passing through both the footrest and the fender to evacuate snow from the toe pocket.

21. The footrest system of claim 19, further comprising a snow deflection recess formed into the fender relative to the snow evacuation bore to prevent snow from entering the snow pocket through the snow evacuation bore.

22. A footrest system for use on a snowmobile, the footrest system comprising:

a footrest extending from a first proximal end to a second distal end, a proximal portion of the footrest extending along a plane; and a fender positioned adjacent to the proximal portion of the footrest, the fender having a snow deflection surface;

wherein the snow deflection surface is below the proximal portion of the footrest extending along the plane to deflect snow away from the footrest.

23. The footrest system of claim 22, wherein the proximal portion of the footrest is angled upward along the plane relative to another portion of the footrest.

24. The footrest system of claim 22, wherein the fender covers the proximal portion of the footrest to define a toe pocket.

25. The footrest system of claim 24, further comprising a snow evacuation bore in the toe pocket and passing through the footrest and the fender.

* * * * *

UNITED STATES PATENT AND TRADEMARK OFFICE
CERTIFICATE OF CORRECTION

| | | |
|---|---|---|
| PATENT NO. | : 11,511,820 B2 | Page 1 of 1 |
| APPLICATION NO. | : 16/723777 | |
| DATED | : November 29, 2022 | |
| INVENTOR(S) | : Michael A. Hedlund et al. | |

It is certified that error appears in the above-identified patent and that said Letters Patent is hereby corrected as shown below:

On the Title Page

Item (12) Hedlund should read:
Hedlund et al.

Item (72) Please add Inventors:
Jeffrey Eaton, Roseau, MN
Matthew Prusak, Salol, MN
James E. Rogala, Bryon Center, MI
Cameron Fisher, Plymouth, MN
Dustin Mertens, Roseau, MN Signed and Sealed this
Fourth Day of March, 2025

Coke Morgan Stewart
*Acting Director of the United States Patent and Trademark Office*